(12) United States Patent
Lewtas et al.

(10) Patent No.: US 7,210,339 B2
(45) Date of Patent: May 1, 2007

(54) ADHESIVE COMPOSITIONS AND METHOD FOR SELECTION THEREOF

(75) Inventors: Kenneth Lewtas, Tervuren (BE); Antonie Jan Bons, Kessel-Lo (BE); Johan Stuyver, Erembodegem (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 135 days.

(21) Appl. No.: 10/795,699

(22) Filed: Mar. 8, 2004

(65) Prior Publication Data

US 2004/0186215 A1    Sep. 23, 2004

Related U.S. Application Data

(60) Provisional application No. 60/456,393, filed on Mar. 30, 2003.

(51) Int. Cl.
   *G01B 5/28*   (2006.01)
   *G01B 21/30*  (2006.01)
   *B32B 7/02*   (2006.01)

(52) U.S. Cl. ............................ 73/105; 73/104; 73/866; 428/355 R; 250/306; 250/307

(58) Field of Classification Search ............ 423/355 R; 428/355 EN, 355 R; 524/270, 474, 487; 73/105
   See application file for complete search history.

(56) References Cited

U.S. PATENT DOCUMENTS

| | | | |
|---|---|---|---|
| 4,028,292 A | * | 6/1977 | Korpman .................... 524/203 |
| 4,554,304 A | | 11/1985 | Hansen et al. .............. 524/291 |
| 4,719,260 A | * | 1/1988 | Stuart et al. .................. 525/74 |
| 5,193,383 A | * | 3/1993 | Burnham et al. ............. 73/105 |
| 5,477,732 A | * | 12/1995 | Yasue et al. .................. 73/105 |
| 2002/0114967 A1 | * | 8/2002 | Yamamoto et al. ......... 428/523 |
| 2004/0260021 A1 | * | 12/2004 | Macedo et al. ............... 525/63 |

FOREIGN PATENT DOCUMENTS

| | | |
|---|---|---|
| EP | 0 803 559 | 10/1997 |
| JP | 2000-178518 A * | 6/2000 |
| WO | WO 03/025036 | 3/2003 |
| WO | WO 03/025037 | 3/2003 |
| WO | WO 03/025038 | 3/2003 |
| WO | WO 03/025084 | 3/2003 |

OTHER PUBLICATIONS

JP 2000-178518 (abstract and translation in English).*
Derwent Abstract JP 52 090535-Japan (Jul. 29, 1977).
"Study on Preparation of EVA Hot Melt Adhesive with Modified Petroleum Resin as Tackifier", *Chinese Journal of Specialty Petrochemicals*, No. 6, Nov. 2002.
"Study of Graft $C_5$Petroleum Resin by Maleic Anhydride", *Journal of Shandong Institute of Light Industry*, vol. 12, No. 3, Sep. 1998.

* cited by examiner

*Primary Examiner*—David W. Wu
*Assistant Examiner*—Rip A. Lee
(74) *Attorney, Agent, or Firm*—M. Michalerya

(57) ABSTRACT

Adhesive compositions and a method for selecting adhesive compositions are disclosed herein. Preferred adhesives generally have small domains and/or a homogeneous domain distribution. The method of selecting adhesives is based on size and distribution of the domains.

8 Claims, 4 Drawing Sheets

Example 1
Tackifier 1 + EVA
Pull-off Force

Example 1
Tackifier 1 + EVA
Stiffness

Example 2
Tackifier 2 + EVA.
Pull-off Force

Example 2
Tackifier 2 + EVA
Stiffness

Example 3
Tackifier 3 + EVA
Pull-off Force

Example 3
Tackifier 3 + EVA
Stiffness

Example 4
Tackifier 1 + EVA + wax
Topography

Example 4
Tackifier + EVA + wax
Phase Shift

Example 5
Tackifier 2 + EVA + wax
Topography

Example 5
Tackifier 2 + EVA + wax
Phase Shift

Example 6
Tackifier 3 + EVA + wax
Topography

Example 6
Tackifier 3 + EVA + wax
Phase Shift

Low Pull-Of Force Domains
Based on Comparative Example 2

High Pull-Off Force Domains
Based on Comparative Example 2

Low Stiffness Domains
Based on Comparative Example 2

High Stiffness Domains
Based on Comparative Example 2

ADHESIVE COMPOSITIONS AND METHOD FOR SELECTION THEREOF

CROSS REFERENCE TO RELATED APPLICATIONS

This application claims the benefit of Provisional Patent Application No. 60/456,393, filed Mar. 30, 2003, the disclosure of which is incorporated by reference.

FIELD OF THE INVENTION

This invention relates to adhesives and methods for selecting adhesives based on their adhesive phase structures or properties. Applicants believe that the bulk and surface adhesive phase structures are relevant in determining the adhesive performance and that methods for determining the accurate meso-scale phase structures are relevant for determining the performance of adhesives.

BACKGROUND

Adhesives can be made in many forms. Many adhesives are made from relatively high molecular weight polymers mixed with low molecular weight tackifying resins. They may or may not be further combined with other components such as oil or wax to control properties such as viscosity at application temperature, adhesive open time, and set time.

Polymers supply many of the basic adhesive properties such as cohesion and elongational and elastic behaviors. Relatively low molecular weight resins (usually with number average molecular weights (Mn) ranging from 300 to 2000) are useful in adhesive applications. When combined with polymers such as those described above, these low molecular weight resins decrease the entanglement density of the polymer chains, which improves the adhesive properties. Tackifiers also have relatively high glass transition temperatures (Tg) for such low molecular weight amorphous materials. The Tg is typically from below 0° C. to about 90° C. Tackifiers interact with the polymer chains and associate with the amorphous polymer phases at the desired operating temperatures; therefore, good compatibility and dispersion is desired for advantageous performance.

Other components are often used and dispersed in the adhesive matrix. Waxes are often used in hot-melt adhesives (HMAS) to lower viscosity at the application temperature and to decrease the set time of the adhesive bond. The waxes crystallize rapidly resulting in a step-change in viscosity during cooling and preventing movement of the bond. For good adhesion, the wax crystals are preferably as small as possible and preferably do not form a wax surface layer on the adhesive.

It is desirable to keep a continuous polymer phase in the bulk phase to enable elongation of the matrix under stress. If this is not done, the adhesive may break at very short extensions and not be able to absorb the energy during bond deformation. It is therefore desired to have an adhesive having small and/or homogeneously distributed domains as described herein.

Good surface phase structures or domains are also desirable. Many adhesives have good adhesion to certain substrates but not to others. For example, some adhesives do not exhibit high all-around performance on polar surfaces, such as polyethylene terephthalate (PET), acrylic varnishes or low energy surfaces such as polyethylene or fluorinated substrates. The adhesive industry recognizes this problem but has yet to achieve a solution. Background references include U.S. Pat. Nos. 4,554,304, 4,719,260, WO 03/025036, WO 03/025037, WO 03/025038, WO 03/025084, JP 52 090535 A, and EP 0 803 559 A.

Thus, a need exists for optimum adhesives that achieve good adhesive performance regardless of the substrate. There also exists a need for a method to determine which adhesive compositions might be candidates for excellent performance on multiple substrates.

While not wishing to be bound by any theory, Applicants believe that adhesive performance, including the debonding process, is dependent on the phase structures (also referred to herein as domains) in the bulk of the adhesive and on the surface of the adhesive. When the pull-off force domains or stiffness domains are below a certain area and/or have a good homogeneous domain distribution, the overall adhesive performance is believed to be better.

SUMMARY

A method is disclosed for selecting an adhesive composition having improved performance, the method comprising observing a surface using an atomic force microscope wherein the surface is a non-destructively de-bonded surface of the adhesive composition. The method comprises (a) subdividing the de-bonded surface into domains as defined herein of pull-off force or stiffness; and, (c) selecting an adhesive composition having:

(i) an average stiffness domain area $\leq$ about 2500 $nm^2$; or (ii) an average pull-off force domain area $\leq$ about 2500 $nm^2$; or (iii) an pull-off force overall average domain distribution less than about 25%; or (iv) a stiffness overall average domain distribution less than about 25%; or (v) combinations of any two or more thereof.

Also disclosed herein are adhesive compositions meeting any one or more of the above parameters (i)–(v), articles comprising an adhesive composition meeting any one or more of the above parameters, the use of any such compositions, the use of tackifiers to control the size (area) of the stiffness and/or pull-off force domains and/or the distributions of these domains as described herein.

BRIEF DESCRIPTION OF THE DRAWINGS

" FIGS. 7, 9, and 11 illustrate topographical images, and FIGS. 8, 10, and 12 illustrate phase shift images.

DETAILED DESCRIPTION

General Definitions

It is possible to use different techniques to determine the phase/domain structures, but Atomic Force Microscopy (AFM) is preferred. A relatively recently developed offshoot of AFM, Pulse Force Microscopy (PFM), is even more preferable, and was used to analyze the adhesive compositions in the examples.

As used herein, high stiffness domains and low stiffness domains are areas within the adhesive matrix defined by PFM stiffness imaging.

As used herein, high pull-off force (or adhesion) domains and low pull-off force (or adhesion) domains are areas within the adhesive matrix defined by PFM adhesion imaging.

A domain is a region or area within an overall adhesive matrix wherein there is the same physical property (e.g., pull-off force, stiffness) around which there is a difference in this property. For example, differences in pull-off force or stiffness within the adhesive matrix occur where there are regions of high pull-off force or stiffness varying to regions of low pull-off force or stiffness. Average domain areas within a given adhesive matrix are calculated as described below.

Figure 1:
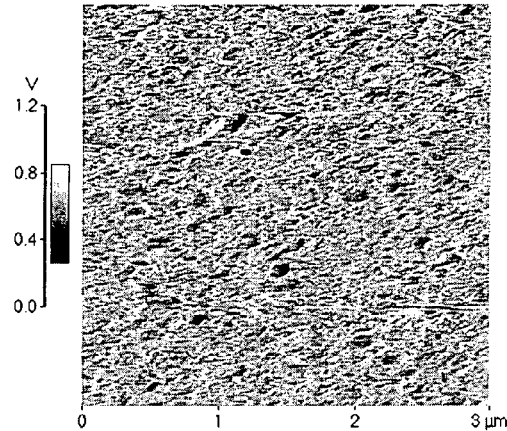
FIGS. 1–6 are Pulse Force Microscopy (PFM) images illustrating the pull-off force domain areas, stiffness domain areas, pull-off force domain distributions and/or the stiffness domain distributions for Examples 1–3 described herein.
Figure 2:
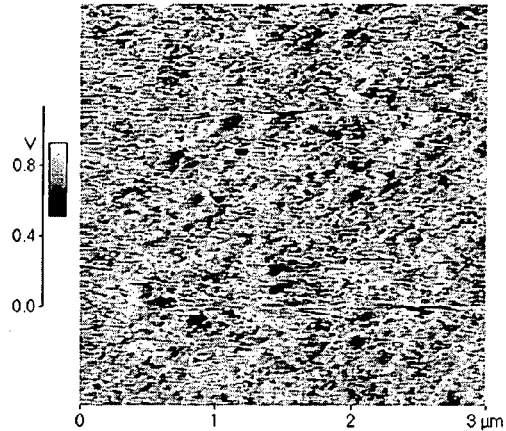
Figure 3:
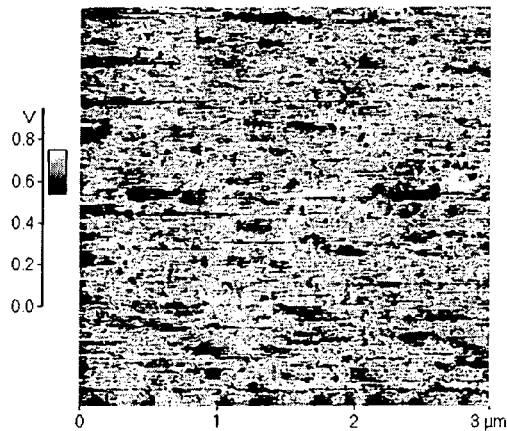
Figure 4:
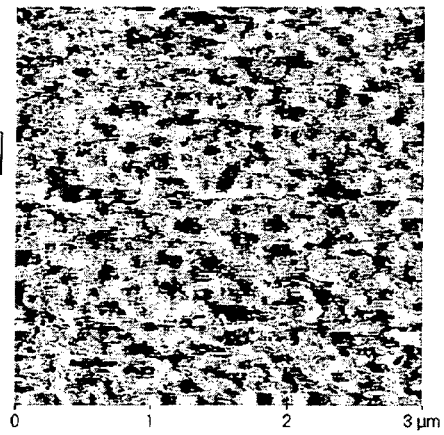
Figure 5:
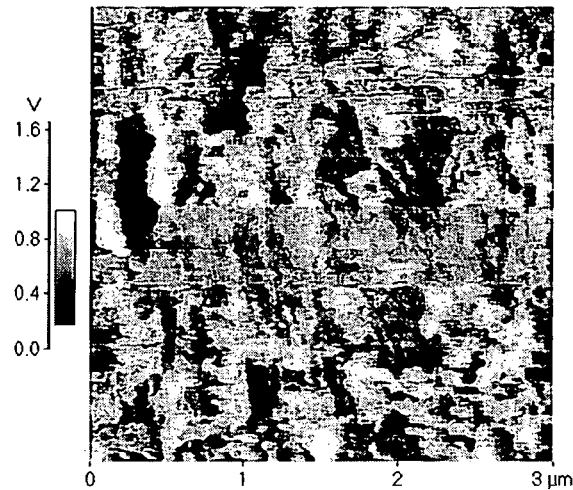
Figure 6:
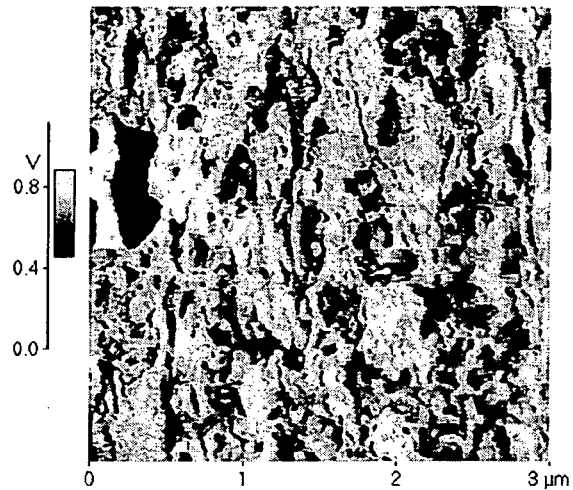
Figure 7:
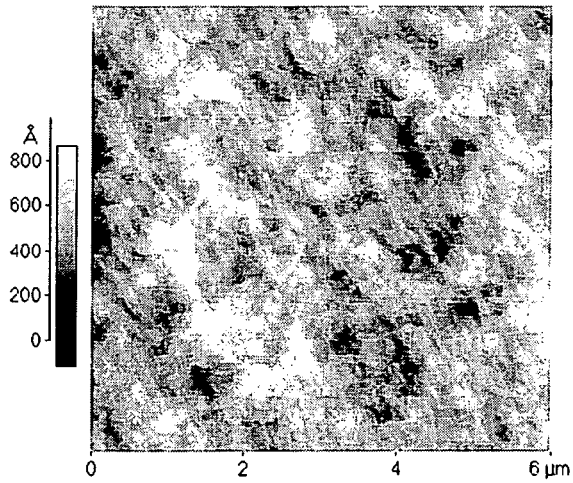
FIGS. 7–12 are Atomic Force Microscopy (AFM) images generated in "tapping mode.
Figure 8:
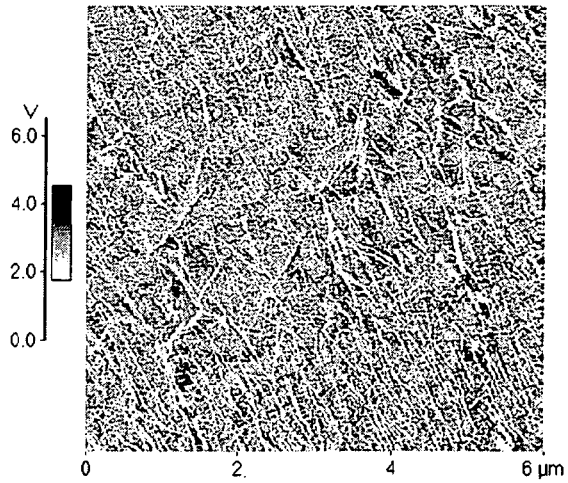
Figure 9:
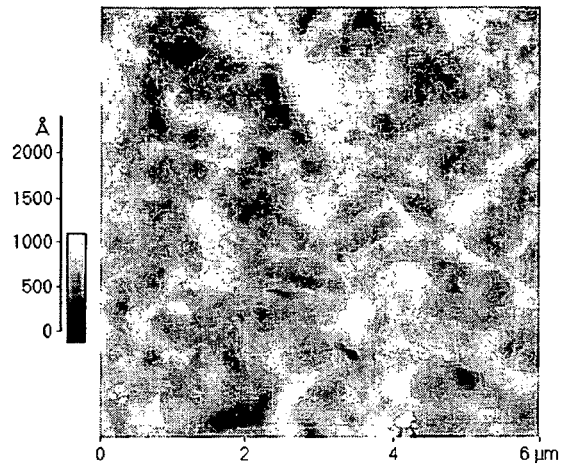
Figure 10:
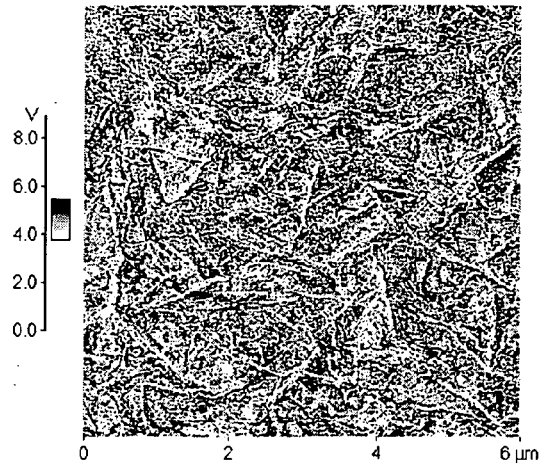
Figure 11:
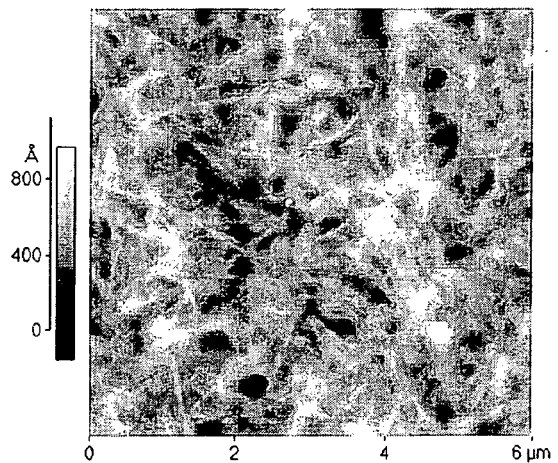
Figure 12:
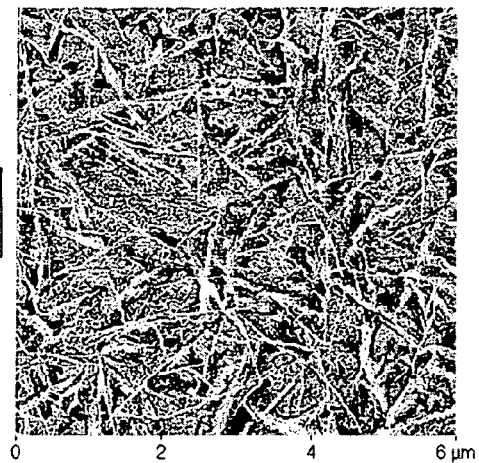

For example, FIGS. 2, 4 and 6 show gray-scale PFM stiffness images corresponding to Examples 1, 2 and 3 herein. In the Figures, the lighter the region, the higher the stiffness and the darker the region, the lower the stiffness. Comparing FIGS. 2, 4 and 6, the formulation containing Tackifier 3 (FIG. 6, Example 3) gives larger, fewer domains with low stiffness and larger, fewer domains with high stiffness, and the distribution of these domains is not homogeneous across the image field. The formulation with Tackifier 2 (FIG. 4, Example 2) has smaller domain sizes and more evenly distributed throughout the image field, and consequently it gives better adhesive performance. The formulation containing Tackifier 1 (FIG. 2, Example 1) has the smallest and most homogeneously distributed stiffness domains and gives the best adhesive performance. Similar analyses hold true for the pull-off force domains generated in corresponding FIGS. 1, 3 and 5.

Because there is almost always a continuous transition region from one stiffness/pull-off force region to another, it is preferred to assign boundaries to these regions for the purpose of quantifying their sizes to clarify the differences between adhesives and to determine how these structures/domains affect the adhesive properties. The method for assigning the transition regions, and hence the size, area and distribution of the domains, is described below. The analytical techniques described herein determine the sizes or areas of the domains by analyzing two-dimensional images, and therefore area measurements are given.

Molecular weights (number average molecular weight (Mn), weight average molecular weight (Mw), and z-average molecular weight (Mz)) are measured by Size Exclusion Chromatography using a Waters 150 Gel Permeation Chromatograph equipped with a differential refractive index detector and calibrated using polystyrene standards. Samples are run in tetrahydrofuran (THF) at a temperature of 45° C. Molecular weights are reported as polystyrene-equivalent molecular weights and are generally measured in g/mol.

Saponification number, as used herein, was measured according to the following procedure. 2 g of powdered resin material to be evaluated was dissolved in 25 ml toluene/isopropanol (1:1 wt ratio) and 50 ml of 0.1N alcoholic KOH was added by pipette. After refluxing for 30 min and cooling to room temperature the solution was titrated against 0.1N HCl using phenolphthaleine indicator. A blank run was carried out without resin material. Saponification number (mg KOH/g resin) was then calculated by multiplying 56.1 (approximate molecular weight of KOH)×volume of standard HCl×Normality of HCl divided by the weight of resin material sample.

Aromatic content and olefin content are measured by $^1$H-NMR as measured directly from the $^1$H NMR spectrum from a spectrometer with a field strength greater than 300 MHz, most preferably 400 MHz (frequency equivalent). Aromatic content is the integration of aromatic protons versus the total number of protons. Olefin proton or olefinic proton content is the integration of olefinic protons versus the total number of protons.

Adhesive Compositions

Disclosed are adhesive compositions and methods for selecting adhesive compositions. Adhesive compositions have stiffness domains, pull-off force domains, a stiffness domain distribution, and a pull-off force domain distribution. When the adhesive comprises a wax, the adhesive may also have an average wax crystal size and a wax crystal size distribution. As previously noted, these parameters are useful in assessing adhesive performance and selecting adhesives based on these parameters. Preferred adhesives meet the following parameters, preferably when adhered to and non-destructively de-bonded from a surface:

(i) an average stiffness domain area≦about 2500 nm$^2$; or
(ii) an average pull-off force domain area≦about 2500 nm$^2$; or
(iii) a pull-off force domain distribution less than about 25%; or
(iv) a stiffness domain distribution less than about 25%; or
(v) combinations of any two or more thereof.

Preferred compositions possess at least two of parameters (i) through (iv), more preferably at least three of parameters (i) through (iv), and most preferably all four of parameters (i) through (iv). Combinations of one, two, three or four of parameters (i) through (iv) in any of the preferred ranges of such parameters as described below are also within the scope of the invention.

In a preferred embodiment the surface is e.g., PTFE, polyethylene-co-tetrafluoroethylene, or other fluorinated surface, when determining the parameters. Preferably, the fluorinated surface is smooth.

It is believed that the average stiffness domain area, average pull-off force domain area, stiffness domain distribution, and pull-off force domain distribution can be controlled by the selection of particular components within an adhesive, e.g., selection of particular tackifiers in combination with a particular polyolefin and/or wax, to achieve the aforementioned parameters.

The stiffness domains of the adhesives or articles comprising an adhesive layer preferably have an average stiffness domain area≦about 2500 nm$^2$, more preferably≦about 2400 nm$^2$, more preferably≦about 2300 nm$^2$, more preferably≦about 2200 nm$^2$, more preferably≦about 2100 nm$^2$, more preferably≦about 2000 nm$^2$, more preferably≦about 1900 nm$^2$, more preferably≦about 1800 nm$^2$, more preferably≦about 1700 nm$^2$, more preferably≦about 1600 nm$^2$, more preferably≦about 1500 nm$^2$, more preferably≦about 1400 nm$^2$, more preferably≦about 1300 nm$^2$, more preferably≦about 1200 nm$^2$, more preferably≦about 1100 nm$^2$, more preferably≦about 1000 nm$^2$, more preferably≦about 900 nm$^2$, more preferably≦about 800 nm$^2$, more preferably≦about 700 nm$^2$, more preferably≦about 600 nm$^2$, more preferably≦about 500 nm$^2$, more preferably≦about 400 nm$^2$, more preferably≦about 300 nm$^2$, more preferably≦about 200 nm$^2$, and more preferably≦about 100 nm², wherein suitable ranges comprise the combination of any two limits in this paragraph.

The pull-off force domains of the adhesives or articles comprising an adhesive layer preferably have an average pull-off force domain area≦about 2500 nm², more preferably≦about 2400 nm², more preferably≦about 2300 nm², more preferably≦about 2200 nm², more preferably≦about 2100 nm², more preferably≦about 2000 nm², more preferably≦about 1900 nm², more preferably≦about 1800 nm², more preferably≦about 1700 nm², more preferably≦about 1600 nm², more preferably≦about 1500 nm², more preferably≦about 1400 nm², more preferably≦about 1300 nm², more preferably≦about 1200 nm², more preferably≦about 1100 nm², more preferably≦about 1000 nm², more preferably≦about 900 nm², more preferably≦about 800 nm², more preferably≦about 700 nm²more preferably≦about 600 nm², more preferably≦about 500 nm², more preferably≦about 400 nm², more preferably≦about 300 nm², more preferably≦about 200 nm², and more preferably≦about 100 nm², wherein suitable ranges comprise the combination of any two limits in this paragraph.

The pull-off force overall average domain distributions are preferably less than about 25%. More preferably the distributions are less than about 20%, more preferably less than about 19%, more preferably less than about 18%, more preferably less than about 17%, more preferably less than about 16%, more preferably less than about 15%, more preferably less than about 14%, more preferably less than about 13%, more preferably less than about 12%, more preferably less than about 11%, more preferably less than about 10%, more preferably less than about 9%, more preferably less than about 8%, more preferably less than about 7%, more preferably less than about 6%, more preferably less than about 5%, more preferably less than about 4%, more preferably less than about 3%, more preferably less than about 2%, and more preferably less than about 1%, wherein suitable ranges comprise the combination of any two limits in this paragraph.

The stiffness overall average domain distributions are preferably less than about 25%. More preferably the distributions are less than about 20%, more preferably less than about 19%, more preferably less than about 18%, more preferably less than about 17%, more preferably less than about 16%, more preferably less than about 15%, more preferably less than about 14%, more preferably less than about 13%, more preferably less than about 12%, more preferably less than about 11%, more preferably less than about 10%, more preferably less than about 9%, more preferably less than about 8%, more preferably less than about 7%, more preferably less than about 6%, more preferably less than about 5%, more preferably less than about 4%, more preferably less than about 3%, more preferably less than about 2%, and more preferably less than about 1%, wherein suitable ranges comprise the combination of any two limits in this paragraph.

It is preferred to keep a continuous polymer phase in the bulk phase to enable elongation of the matrix under stress. If this is not done, the adhesive may break at very short extensions and not be able to absorb the energy during bond deformation. It is therefore desired to have an adhesive having small and/or homogeneously distributed domains. Preferably, the adhesive compositions have average stiffness domain areas in any one of the preferred ranges listed above and a stiffness domain distribution within any one of the preferred ranges listed above. Preferably the adhesive compositions have average pull-off force domain areas in any one of the preferred ranges listed above and a pull-off force domain distribution within any one of the preferred ranges listed above.

Many adhesive composition embodiments may further comprise a wax. Wax is an adhesive component that is added to alter high temperature viscosity and decrease the setting time as the adhesive cools. Wax is normally mostly paraffinic or polyethylene-like in nature, but it can be functionalized if desired. Wax crystals form rapidly and grow throughout the adhesive matrix. This produces a step-change in effective viscosity and prevents the applied adhesive bond from failing. Unfortunately, the solid wax crystals can have two detrimental effects. First, if they grow too large they can inter-lock and severely reduce the elongational properties of the bulk adhesive. Second, if they grow preferentially on the surface of the adhesive, they can hinder the adhesive attractions of the adhesive. It is therefore preferred to reduce the wax crystal sizes and inhibit their effect on the surface. AFM can also be used to investigate the wax crystal structures. The methods disclosed herein for measurement of domain areas are also useful for evaluating wax-containing adhesive materials. It is preferred, however, to remove the wax from the formulation by conventional methods and evaluate the adhesive without the wax. With the wax present, views of the details of the domains may be obscured during the AFM or PFM analysis. It is believed, however, that the method of evaluating the domains without wax present is a valid approximation to the phases or domains in the formulations where wax is present.

The adhesive or article comprising a layer of adhesive material may comprise any combination of the above parameters. In some embodiments, the adhesive or adhesive material may be derived from, comprise, or be selected from catalytically polymerized tackifiers, thermally polymerized tackifiers, natural resin tackifiers, rosin tackifiers, non-hydrogenated tackifiers, non-thermally polymerized tackifiers, and/or non-aromatic tackifiers and/or combinations thereof. Other embodiments may comprise one or more tackifiers as described below. Still other embodiments may comprise wax-free adhesive compositions, or compositions with less than about 20 wt % wax, more preferably less than about 15 wt % wax, more preferably less than about 10 wt % wax, and more preferably less than about 5 wt % wax based on the total weight of the adhesive composition.

Applicants believe that by using specific tackifiers in adhesive compositions, the average stiffness domain area, the average pull-off force domain area, the stiffness domain distribution and the pull-off force domain distribution can be controlled to yield high performing adhesive materials. It is also believed that in adhesive compositions comprising wax, the wax crystal size and wax crystal distribution can be controlled to yield improved adhesive materials.

If no tackifier is used, the adhesive matrix may still comprise domains as described herein, and the same principles would apply to such formulations.

Adhesive Formulations

Typical adhesive formulations generally comprise one or more tackifiers and one or more polyolefins. For example, typical hot melt adhesives comprise about 10–40 wt % adhesive polymer such as an SIS or SBS block copolymer, about 50–70 wt % tackifier and about 5–30 wt % oil or other additives described herein. Typical packaging or bookbinding hot melt adhesives comprise about 20–55 wt % adhesive polymer such as an EVA copolymer, about 35–60 wt % tackifier and about 5–30 wt % oil, wax or other additives described herein. Typical pressure sensitive adhesives comprise about 25–50 wt % adhesive polymer, such as a SIS block copolymer, about 40–70 wt % tackifier and about 0–20 wt % oil or other suitable additive. These weight percents are based on the total weight of the adhesive formulation.

Tackifiers

The tackifier is preferably selected from the group consisting of: aliphatic hydrocarbon resins, hydrogenated aliphatic hydrocarbon resins, aromatic hydrocarbon resins, hydrogenated aromatic resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, polyterpene resins, terpene-phenol resins, rosin esters, grafted versions of any of the above, and mixtures of any two or more thereof. As used herein, the term tackifier includes, but is not limited to, hydrocarbon resins, oligomers and/or resin material and the terms may be used interchangeably. Preferred tackifiers have a Mw less than about 10,000.

The tackifiers may have a softening point between about 80–180° C. If aromatics are present, the tackifier preferably has an aromatic content of about 1–60%, more preferably about 1–40%, more preferably about 1–20%, more preferably about 1–15%, more preferably about 5–15%, more preferably about 10–20%, more preferably about 15–20%, and in another embodiment, more preferably about 1–10%, and more preferably-about 5–10%, wherein any upper limit and any lower limit of aromatic content may be combined for a preferred range of aromatic content. The tackifier may or may not be hydrogenated, either partially or substantially as defined below.

Hydrocarbon Resin Production

Hydrocarbon resins are well known and are produced, for example, by Friedel-Crafts polymerization of various feeds, which may be pure monomer feeds or refinery streams containing mixtures of various unsaturated materials. Generally speaking, the purer the feed the easier to polymerize. For example pure styrene, pure a-methyl styrene and mixtures thereof are easier to polymerize than a $C_8/C_9$ refinery stream. Similarly, pure or concentrated piperylene is easier to polymerize than $C_4$–$C_6$ refinery streams. These pure monomers are, however, more expensive to produce than the refinery streams which are often by-products of large volume refinery processes.

Aliphatic hydrocarbon resins can be prepared by cationic polymerization of a cracked petroleum feed containing $C_4$, $C_5$, and $C_6$ paraffins, olefins, and conjugated diolefins referred to herein as $C_5$ monomers. As used herein, $C_5$ monomers preferably excludes dicyclopentadiene (DCPD) monomer removed by thermal soaking as described below. These monomer streams comprise cationically and thermally polymerizable monomers such as butadiene, isobutylene, 1,3-pentadiene (piperylene) along with 1,4-pentadiene, cyclopentene, 1-pentene, 2-pentene, 2-methyl-1-pentene, 2-methyl-2-butene, 2-methyl-2-pentene, isoprene, cylcohexene, 1-3-hexadiene, 1-4-hexadiene, cyclopentadiene, and dicyclopentadiene. To obtain these $C_5$ monomer feeds the refinery streams are preferably purified usually by both fractionation and treatment to remove impurities. In some embodiments, the $C_5$ monomer feed stream may include at least some cyclopentadiene (CPD) and substituted cyclopentadiene (e.g., methylcyclopentadiene) components. These components are optionally separated from the $C_5$ monomer streams by thermal soaking wherein the $C_5$ monomer feed stream is heated to a temperature between 100° C. and 150° C. for 0.5 to 6 hours followed by separation of the DCPD monomers, to reduce the level of cyclopentadiene or dicyclopentadiene in the $C_5$ monomer stream to preferably below 2 wt %. Low temperature heat soaking is preferred in order to limit the cyclic diene (cyclopentadiene and methylcyclopentadiene) co-dimerization with $C_5$ linear conjugated dienes (isoprene and pentadienes 1,3 cis- and trans-). The thermal soaking step preferably dimerizes the cyclopentadiene and substituted cyclopentadiene, making separation from the $C_5$ monomer stream easier. After fractionation and, if carried out, thermal soaking, the feedstock is preferably subjected to distillation to remove cyclic conjugated diolefins which are gel precursors (cyclopentadiene and methylcyclopentadiene being removed as dimers, trimers, etc.).

One example of a $C_5$ monomer stream is a steam cracked petroleum stream boiling in the range of −10° C. to 100° C. Examples of commercial samples of $C_5$ monomer feedstocks include Naphtha Petroleum 3 Piperylenes from Lyondell Petrochemical Company, Houston, Tex., and regular Piperylene Concentrate or Super Piperylene Concentrate both from Shell Nederland Chemie B. V., Hoogvliet, the Netherlands.

The resin polymerization feed may also comprise $C_8$–$C_{10}$ aromatic monomers (referred to herein as $C_9$ monomers) such as styrene, indene, derivatives of styrene, derivatives of indene, and combinations thereof. Particularly preferred aromatic olefins include styrene, α-methylstyrene, β-methylstyrene, indene, methylindenes and vinyl toluenes. One example of a $C_9$ monomer stream is a steam cracked petroleum stream boiling in the range of −10° C. to 210° C. (135° C. to 210° C. if the $C_5$ monomers and DCPD components are not present). Examples of commercial $C_9$ monomer feedstocks include LRO-90 from Lyondell Petrochemical Company, Houston, Tex., DSM $C_9$ Resinfeed Classic from DSM, Geleen, the Netherlands, RO-60 and RO-80 from Dow Chemical Company of Midland, Mich., and Dow Resin Oil 60-L from the Dow Chemical Company of Terneuzen, the Netherlands.

In addition to the reactive components, non-polymerizable components in the feed may include saturated hydrocarbons such as pentane, cyclopentane, or 2-methylpentane that can be co-distilled with the unsaturated components. This monomer feed can be co-polymerized with other $C_4$ or $C_5$ olefins or dimers. Preferably, however, the feeds are purified to remove unsaturated materials that adversely affect the polymerization reaction or cause undesirable colors in the final resin (e.g., isoprene). This is generally accomplished by fractionation. In one embodiment, polymerization is conducted using Friedel-Crafts polymerization catalysts such as supported or unsupported Lewis acids (e.g., boron trifluoride ($BF_3$), complexes of boron trifluoride, aluminum trichloride ($AlCl_3$), complexes of aluminum trichloride or alkyl aluminum halides, particularly chlorides). Suitable reaction conditions for Friedel-Crafts polymerization include temperatures of −20° C. to 100° C., and pressures of 100 to 2000 kPa. $C_5$ and $C_9$ monomers may be polymerized by such a process.

Typically, the feed stream includes from 20–80 wt % monomers and 20–80 wt % solvent, based on the total weight of the feed stream. Preferably, the feed stream includes 30–70 wt % monomers and 30–70 wt % of solvent. More preferably, the feed stream includes 50–70 wt % monomers and 30–50 wt % of solvent. The solvent may include an aromatic solvent, which may be toluenes, xylenes, other aromatic solvents, aliphatic solvents and/or mixtures of two or more thereof. The solvent is preferably recycled. The solvent may comprise the unpolymerizable component of the feed. The solvents generally contain less than 250 ppm water, preferably less than 100 ppm water, and most preferably less than 50 ppm water.

The monomers in the feed stream may include 30–95 wt % of $C_5$ monomers, as described above and 5–70 wt % of a co-feed including at least one member selected from the group consisting of pure monomer, $C_9$ monomers, and terpenes. Preferably, the feed stream includes about 50–85 wt % of $C_5$ monomers and about 15–50 wt % of a co-feed, including at least one member selected from the group consisting of pure monomer, $C_9$ monomers, and terpenes. The weight percents in this paragraph are based on the total weight of the feed monomers.

Typically, the resulting hydrocarbon resin has a number average molecular weight (Mn) of 400–3000, a weight average molecular weight (Mw) of 500–6000, a z-average molecular weight (Mz) of 700–15,000 and a polydispersity (PD) as measured by Mw/Mn of from 1.5 to 4.

The monomer feed can be copolymerized with $C_4$ or $C_5$ olefins or their olefinic dimers as chain transfer agents. Up to 40 wt %, preferably up to 20 wt % based on the total weight of the feed, of chain transfer agents may be added to obtain resins with lower and narrower molecular weight distributions than can be prepared from using the monomer feed alone. Components which behave as chain transfer agents in these reactions include, but are not limited to, 2-methyl-1-butene, 2-methyl-2-butene or dimers or oligomers of these species. The chain transfer agent can be added to the reaction in pure form or diluted in a solvent.

A DCPD resin and/or oligomers thereof (referred to also as CPD oligomers) may be obtained by thermal polymerization of a feed comprising unsaturated monomers of DCPD and/or substituted DCPD. The feed may also comprise aromatic monomers as previously described. Generally, a mixture of (a) DCPD stream, preferably a steam cracked petroleum distillate boiling in the range 80–200° C., more preferably 140° C. to 200° C., containing dimers and codimers of cyclopentadiene and its methyl derivatives together with (b) $C_9$ monomers, preferably a steam cracked distillate boiling in the range 150–200° C. comprising α-methyl styrene, vinyl toluenes, indene and methyl indene with other $C_9$ and $C_{10}$ aromatics, in the weight ratio (a:b) of from 90:10 to 50:50 is heated in a batch polymerization reactor to 160–320° C. at a pressure of 980 kPa to 2000 kPa (more preferably $9.8 \times 10^5$–$11.7 \times 10^5$ Pa), for 1.2 to 4 hours, more preferably 1.5 to 4 hr. Where inclusion of the oligomers is not desired, the resulting polymerizate may be steam stripped to remove inert, unreacted, and low molecular weight oligomeric components to yield a resin having a softening point in the range of 80–120° C.

The resin may also be obtained by or derived from thermal polymerization of a feed comprising $C_5$ monomers and $C_9$ monomers as previously described. In such embodiments, a mixture of (a) $C_5$ monomers, preferably, a steam cracked petroleum distillate boiling in the range 80–200° C. containing $C_5$ monomers together with (b) $C_9$ monomers, preferably a steam cracked distillate boiling in the range 150–200° C. comprising α-methyl styrene, vinyl toluenes, indene and methyl indene with other $C_8$–$C_{10}$ aromatics, in the weight ratio (a:b) of from 90:10 to 50:50 is heated in a batch polymerization reactor to 160–320° C. at a pressure of 980 kPa to 2000 kPa (more preferably $9.8 \times 10^5$–$11.7 \times 10^5$ Pa), for 1.2 to 4 hours, more preferably 1.5 to 4 hr. Where inclusion of the oligomers is not desired, the resulting polymerizate may be steam stripped to remove inert, unreacted, and low molecular weight oligomeric components to yield a resin having a softening point in the range of 80–120° C.

The products of the polymerization process include both resin and an oligomer by-product comprising oligomers (dimers, trimers, tetramers, pentamers, and hexamers, and optionally septamers and octamers) of the feed monomer(s). As used hereafter, resin material refers to the resin, the oligomers, or a mixture of the two. Where the oligomer by-product results from thermal polymerization of DCPD and substituted DCPD, the oligomers are typically a complex mixture of (preferably hydrogenated as described below) Diels Alder trimers and tetramers of CPD and methyl-CPD with low levels of acyclic $C_5$ diolefins such as 1,3-pentadiene and isoprene.

The resin material is then preferably hydrogenated to reduce coloration and improve color stability. Any of the known processes for catalytically hydrogenating resin material can be used. In particular, the processes disclosed in U.S. Pat. Nos. 5,171,793, 4,629,766, 5,502,104 and 4,328,090, and in WO 95/12623 are suitable. Generic hydrogenation treating conditions include reactions in the temperature range of about 100–350° C. and pressures of from 5 atm (506 kPa) to 300 atm (30390 kPa) hydrogen (and even up to 400 atm hydrogen), for example, 10–275 atm (1013–27579 kPa). In one embodiment the temperature is in the range of from 180–330° C. and the pressure is in the range of from 15195–20260 kPa hydrogen. The hydrogen to feed volume ratio to the reactor under standard conditions (25° C., 1 atm (101 kPa) pressure) typically can range from 20:1–200:1; for water-white resins 100:1–200:1 is preferred. The hydrogenated product may be stripped to remove low molecular weight by-products and any solvent. This oligomeric by-product is a low-viscosity nearly colorless liquid boiling between 250–400° C. and is preferably substantially hydrogenated.

The hydrogenation of the resin material may be carried out via molten or solution based processes by either a batch or, more commonly, a continuous process. Catalysts used for the hydrogenation of hydrocarbon resins are typically supported monometallic and bimetallic catalyst systems based on group 6, 8, 9, 10 or 11 elements. Catalysts such as nickel on a support (for example, nickel on alumina, nickel on charcoal, nickel on silica, nickel on kieselguhr, etc.), palladium on a support (for example, palladium on silica, palladium on charcoal, palladium on magnesium oxide, etc.) and copper and/or zinc on a support (for example copper chromite on copper and/or manganese oxide, copper and zinc on alumina, etc.) are good hydrogenation catalysts. The support material typically comprises such porous inorganic refractory oxides as silica, magnesia, silica-magnesia, zirconia, silica-zirconia, titania, silica-titania, alumina, silica-alumina, alumina-silicate, etc., with supports containing γ-alumina being highly preferred. Preferably, the supports are essentially free of crystalline molecular sieve materials. Mixtures of the foregoing oxides are also contemplated, especially when prepared as homogeneously as possible. Useful support materials include those disclosed in U.S. Pat. Nos. 4,686,030, 4,846,961, 4,500,424, and 4,849,093. Suitable supports include alumina, silica, carbon, MgO, $TiO_2$, $ZrO_2$, $Fe_2O_3$ or mixtures thereof.

Another suitable process for hydrogenating the resin material is described in EP 0082726. EP 0082726 describes a process for catalytic or thermal hydrogenation using a nickel-tungsten catalyst on a gamma-alumina support, wherein the hydrogen pressure is $1.47 \times 10^7$–$1.96 \times 10^7$ Pa and the temperature is in the range of 250–330° C. After hydrogenation the reactor mixture may be flashed and further separated to recover hydrogenated resin material. In one embodiment, steam distillation may be used to separate the oligomers and is preferably conducted without exceeding 325° C. resin temperature.

The catalyst may comprise nickel and/or cobalt with one or more of molybdenum and/or tungsten on one or more of alumina or silica supports, wherein the amount of nickel oxide and/or cobalt oxide on the support ranges from 2–10 wt %, based on the total weight of the catalyst. The amount of tungsten or molybdenum oxide on the support after preparation ranges from 5–25 wt %, based on the total weight of the catalyst. Preferably, the catalyst contains 4–7 wt % nickel oxide and 18–22 wt % tungsten oxide. This process and suitable catalysts are described in greater detail in U.S. Pat. No. 5,820,749. In another embodiment, the hydrogenation may be carried out using the process and catalysts described in U.S. Pat. No. 4,629,766. In particular, nickel-tungsten catalysts on gamma-alumina are preferred.

The oligomers may be stripped from the resin before hydrogenation and are preferably hydrogenated before grafting (if necessary and as described below). The oligomers may also be hydrogenated with the resin and then stripped from the resin, yielding a hydrogenated resin and hydrogenated oligomers. At least some of the oligomers may be stripped before hydrogenation and at least some hydrogenated oligomers may be stripped after hydrogenation. The hydrogenated resin/oligomers product may be grafted as described below. The oligomers may also be derived from any suitable source and hydrogenated (if necessary) before grafting so that the oligomers before grafting are typically at least partially hydrogenated and preferably substantially hydrogenated.

Grafted Tackifiers and Tackifier Components

As used herein, a grafted tackifier, or grafted hydrocarbon resin, oligomer, and/or resin material, or a combination thereof means it has been combined, contacted, and/or reacted with a graft monomer. Grafting is the process of combining, contacting, or reacting the hydrocarbon resin, oligomers and/or resin material with the graft monomer. Grafting hydrocarbon resins, oligomers, and/or resin material, or a combination thereof to include at least some polar functionality produces useful tackifier component for many applications.

Grafted resin materials may include, but are not limited to: adhesives or adhesive components comprising (i) grafted hydrocarbon resins; (ii) grafted oligomers, (iii) grafted oligomers+ungrafted resin(s), (iv) grafted hydrocarbon resin+ungrafted resin(s), (v) grafted hydrocarbon resin+ungrafted oligomers, (vi) grafted hydrocarbon resin+grafted oligomers, (vii) grafted oligomers+ungrafted oligomers or (viii) grafted hydrocarbon resin+grafted oligomers+ungrafted resin(s) and other suitable combinations of one or more thereof.

Suitable hydrocarbon resins that may be grafted include: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpenephenol resins, and mixtures of two or more thereof.

The resin and/or oligomers are preferably at least partially hydrogenated and more preferably substantially hydrogenated. As used herein at least partially hydrogenated means that the material contains less than about 90% olefinic protons, more preferably less than about 75% olefinic protons, more preferably less than about 50% olefinic protons, more preferably less than about 40% olefinic protons, more preferably less than about 25% olefinic protons, more preferably less than about 15% olefinic protons, more preferably less than about 10% olefinic protons, more preferably less than about 9% olefinic protons, more preferably less than about 8% olefinic protons, more preferably less than about 7% olefinic protons, and more preferably less than about 6% olefinic protons. As used herein, substantially hydrogenated means that the material contains less than about 5% olefinic protons, more preferably less than about 4% olefinic protons, more preferably less than about 3% olefinic protons, more preferably less than about 2% olefinic protons, more preferably less than about 1% olefinic protons, more preferably less than about 0.5% olefinic protons, more preferably less than about 0.1% olefinic protons, and more preferably less than about 0.05% olefinic protons after hydrogenation (and before reaction with the graft monomer). The degree of hydrogenation is typically conducted so as to minimize and preferably avoid hydrogenation of the aromatic bonds. In preferred embodiments wherein the resin and/or oligomers are substantially hydrogenated, it is believed that the graft monomer is appended to the resin/oligomer backbone as opposed to forming a copolymer (of resin/oligomers and graft monomers) because of the lack of terminal olefinic bonds on the substantially hydrogenated resin/oligomers (as indicated by the preferred low olefinic proton measurements).

The hydrocarbon resin/and or oligomers have an aromatic content of about 1–60%, more preferably about 1–40%, more preferably about 1–20%, more preferably about 1–15%, more preferably about 5–15%, more preferably about 10–20%, more preferably about 15–20%, and in another embodiment, more preferably about 1–10%, and more preferably about 5–10%, wherein any upper limit and any lower limit of aromatic content may be combined for a preferred range of aromatic content. In one embodiment, the hydrocarbon resin to be grafted has a softening point of about 10–200° C., more preferably about 10–160° C., more preferably about 60–130° C., more preferably about 90–130° C., more preferably about 80–120° C., more preferably about 80–150° C., and more preferably about 90–110° C., wherein any upper limit and any lower limit of softening point may be combined for a preferred softening point range. Softening point (° C.) is preferably measured as a ring and ball softening point according to ASTM E-28 (Revision 1996).

Suitable grafted resins include EMFR 100, 100A, and 101 available from ExxonMobil Chemical Company. In one embodiment, a grafted resin comprises hydrocarbon resins produced by the thermal polymerization of dicyclopentadiene (DCPD) or substituted DCPD which are then grafted with a graft monomer. The resin may further include aliphatic or aromatic monomers as described later. In another embodiment, the hydrocarbon resin is produced by the thermal polymerization of dicyclopentadiene (DCPD) or substituted DCPD and $C_9$ monomers or thermal or catalytic polymerization of $C_5$ and $C_9$ monomers. In a preferred embodiment, the grafted resins contain less than 10% aromatics in the final resin product. In another embodiment, the grafted resin comprises 95 wt % of a thermally polymerized dicyclopentadiene resin comprising about 10% aromatics, available as Escorez™ 5600, grafted with maleic anhydride, and 5 wt % of grafted oligomers derived from the production of Escorez™ 5600 and also grafted with maleic anhydride.

Grafted Oligomers

The hydrocarbon resin may also comprise oligomers (dimers, trimers, tetramers, pentamers, hexamers and optionally septamers and octamers), preferably derived from a petroleum distillate boiling in the range of 30–210° C. The oligomers can be derived from any suitable process and are often derived as a byproduct of resin polymerization, whether thermal or catalytic. The oligomers may be derived from processes wherein suitable DCPD, $C_5$ and/or $C_9$ monomer feeds (as described below) are oligomerized and then grafted. Suitable oligomer streams have molecular weights (Mn) of from about 130–500, more preferably from about 130–410, more preferably from about 130–350, more preferably from about 130–270, more preferably from about 200–350, and more preferably from about 200–320. The oligomers may be grafted as described herein.

The oligomers may comprise cyclopentadiene and substituted cyclopentadiene monomers and may further comprise $C_9$ monomers. In another embodiment, the oligomers comprise $C_5$ monomers and may further comprise $C_9$ monomers. Other monomers may also be present, including $C_4$–$C_6$ mono- and di-olefins and terpenes. The oligomers may also be solely $C_9$ monomers. Specific examples of suitable individual cyclopentadiene and substituted cyclopentadiene monomers (including DCPD), $C_9$ monomers and $C_5$ monomers are described herein. Suitable oligomers may also comprise a mixture of more or more preferred oligomer materials as described herein.

Graft Monomers

Preferred graft monomers include any unsaturated organic compound containing at least one olefinic bond and at least one polar group such as a carbonyl group, which includes unsaturated acids and anhydrides and derivatives thereof. Preferably, the organic compound contains an ethylenic unsaturation conjugated with a carbonyl group (—C=O) and preferably contains at least one α, β olefin bond. Examples include carboxylic acids, acid halides or anhydrides, phenols, alcohols (mono-alcohols, diols, and polyols), ethers, ketones, alkyl and aromatic amines (including polyamines), nitriles, imines, isocyanates, nitrogen compounds, halides and combinations and derivatives thereof. Representative acids and acid derivatives include carboxylic acids, anhydrides, acid halides, esters, amides, imides and their salts, both metallic and non-metallic. Examples include maleic, fumaric, acrylic, methacrylic, itaconic, aconitic, citraconic, himic, tetrahydrophthalic, crotonic, α-methyl crotonic, and cinnamic acids. Maleic anhydride is a particularly preferred graft monomer. Particular examples include, itaconic anhydride, citraconic anhydride, methyl acrylate, methyl methacrylate, ethyl acrylate, ethyl methacrylate, glycidyl acrylate, monoethyl maleate, diethyl maleate, dibutyl maleate, monomethyl fumarate, dimethyl fumarate, monomethyl itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. Preferred graft monomers include acids, anhydrides, alcohols, amides, and imides.

Grafting the Resin Material

At least a portion of the resulting resin material, preferably derived from a process such as that described above, may then be combined and/or contacted with a graft monomer, typically under suitable reaction conditions and in a suitable mixing device. The reaction is preferably conducted in the absence of significant shear. As previously described, the resin and oligomers may be grafted separately or simultaneously, and if separately, grafted oligomers may then be optionally remixed with the grafted resin, an ungrafted resin, or any another suitable resin, adhesive component or composition as described below.

Grafting of the graft monomer preferably occurs in the presence of a free-radical initiator selected from the group consisting of organic peroxides, organic per-esters, and azo compounds. Examples of such compounds include benzoyl peroxide, dichlorobenzoyl peroxide, dicumyl peroxide, di-tert-butyl peroxide, 2,5-dimethyl-2,5-di(peroxybenzoate) hexyne-3,1,4-bis(tert-butylperoxyisopropyl)benzene, lauroyl peroxide, tert-butyl peracetate, 2,5-dimethyl-2,5-di(tert-butylperoxy)hexyne-3,2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate, tert-butyl hydroperoxide, tert-butyl perdiethylacetate, azoisobutyronitrile, and dimethyl azoisobutyrate. The peroxide preferably has a half-life of about 6 minutes at 160° C. with volatile non-aromatic decomposition products and those that minimize color formation. Preferred peroxides include di-tert-butyl peroxide and 2,5 dimethyl-2,3-di(tert-butylperoxy)hexane. The amount of peroxide combined is typically dependent on the weight of the graft monomer. The weight ratio of the graft monomer:peroxide in the reaction mixture may be from 1 to 20, more preferably from about 1 to 10, more preferably from about 1 to about 5, and even more preferably about 4.

The graft monomers may be combined with the resin material at a temperature of from 50–200° C., more preferably from 70–150° C., more preferably from 70–125° C., more preferably from 140–180° C., more preferably from 140–180° C., more preferably from 155–165° C. or from 165–175° C., and a pressure of typically one atmosphere but higher pressures can be used if necessary. In another preferred embodiment, the grafting reaction occurs at temperature greater than 90° C., more preferably from 90° C. to any temperature limit described above, more preferably from 90° C. to 150° C., more preferably from 90° C. to 145° C. In general, the lower limit of the reaction temperature is governed by the softening point of the resin as it is preferred to conduct the grafting reactions at temperatures above the softening point of the material to be grafted.

The graft monomer may be combined so that the weight ratio of graft monomer:resin material in the reaction mixture is less than 1, more preferably less than 0.5 more preferably less than 3:10 and more preferably less than 3:20. In a preferred embodiment, the reaction mixture is maintained in a homogenous state. The reaction mixture is preferably agitated or stirred vigorously. The free radical initiator is combined with the resin material-graft monomer reaction mixture either in one addition or preferably in a continuous or semi-continuous mode during the reaction. Residence time in the reaction zone is preferably less than 75 minutes, more preferably less than 60 minutes, more preferably from 10–60 minutes, even more preferably from 30–60 minutes.

Where only the oligomers are grafted, the reaction temperature is preferably from 50–200° C., more preferably from 70–150° C., more preferably from 70–125° C., more preferably from 140–180° C., more preferably from 140–180° C., more preferably from 155–165° C., and more preferably about 160° C. In another embodiment the reaction temperature is 170–185° C. In another preferred embodiment, the grafting reaction occurs at temperature greater than 90° C., more preferably from 90° C. to any temperature limit described above, more preferably from 90° C. to 150° C., more preferably from 90° C. to 145° C. Other preferred ranges may include ranges from any lower to any upper temperature described in this paragraph.

The amount of graft monomer added is typically dependent on the amount of oligomer. Preferably, the oligomer:graft monomer mole ratio is from 5 to 0.2, more preferably from 2 to 0.5, more preferably from about 1.5 to 0.67 and more preferably about 1. Thereafter, the ungrafted oligomers are stripped from the product and optionally recycled to the reaction zone. The grafted oligomers produced generally have a softening point of from 0–120° C., more preferably from 25–120° C., more preferably from 50–120° C. and even more preferably from 80–110° C., and color of 4–10 Gardner. Gardner color, as used herein, is measured using ASTM D-6166. The grafted oligomer product can then be recombined with the resin (grafted or ungrafted) from which it was derived or combined with other resins, polymers, and/or other materials and formulated into and adhesive material.

Where only the resin is grafted, the reaction temperature is preferably between 50–200° C., more preferably between 70–150° C., more preferably between 70–125° C., more preferably between 140–180° C., more preferably between 140–180° C., more preferably between 165–175° C., and more preferably about 170° C. In another embodiment, the grafting reaction preferably occurs between 170–185° C. In another preferred embodiment, the grafting reaction occurs at temperature greater than 90° C., more preferably between 90° C. and any upper temperature limit described above. The amount of graft monomer added is typically dependent on the amount of resin. The graft monomer:resin weight ratio in the reaction mixture is preferably less than 1:5, more preferably less than 1:10, more preferably less than 1:20, and even more preferably about 1:40. Generally, the grafting raises the softening point of the resin less than 10° C., more preferably less than 5° C. and produces a grafted resin having a color between 1–6 Gardner.

In another embodiment, the oligomers are not stripped from the resin product, and the resin and oligomers are simultaneously grafted. Reaction conditions are similar to those previously described for grafting the resin, but the graft monomer:resin material weight ratio is generally kept below 0.5, more preferably below 0.25 and more preferably below 3:20. Upon completion of grafting, the material may be further stripped if required to yield a resin of the desired softening point and/or to remove unreacted oligomers. Separation of the grafted oligomers from the grafted resin may also be made if desired, but the product may be used without such further processing. In many embodiments comprising grafted resin and grafted oligomers, the weight ratio of grafted oligomers:grafted resin in the resin material will be greater than 0.005, more preferably greater than 0.01, more preferably greater than 0.02, more preferably greater than 0.05, and more preferably greater than 0.1.

Grafting of the resin material can also be conducted via a solution route wherein the resin material dispersed in a solvent and combined, contacted and/or reacted with the graft monomer. Additionally or alternatively, the graft monomer can be dispersed in a solvent prior to adding to the resin material. These routes allow for lower reaction temperatures (as low as 80° C. or 100° C.) and allows the choice of different peroxides having half-lives of 6 minutes at the lower reaction temperatures. Suitable solvents include, but are not limited to, aliphatic solvents, cycloaliphatic solvents, aromatic solvents, and aromatic-aliphatic solvents. Typical examples include benzene, toluene, xylene, chlorobenzene, n-pentane, n-hexane, n-heptane, n-octane, n-decane, iso-heptane, iso-decane, iso-octane, cyclohexane, alkyl cyclohexane, and combinations of two or more thereof.

The resulting grafted resin material preferably has a softening point between about 15–210° C., more preferably about 15–170° C., more preferably about 65–140° C., more preferably about 65–130° C., more preferably about 80–120° C., more preferably about 90–110° C., and more preferably between about 85–110° C. The grafted resin material preferably has a glass transition temperature (Tg) less than about 120° C., more preferably less than about 110° C., more preferably from about 25–100° C., more preferably from about 60–100° C., more preferably about 60–80° C., and more preferably from about 35–70° C. In one embodiment the Tg is preferably less than 50° C. Differential Scanning Calorimetry (DSC, ASTM D 341-88) was used to measure Tg. The resulting grafted resin material preferably has a Saponification number (mg KOH/g resin material) greater than about 10, more preferably greater than about 12, more preferably greater than about 15, more preferably greater than about 16, more preferably greater than about 17, more preferably greater than about 18, more preferably greater than about 19, more preferably greater than about 20, more preferably greater than about 25. The resulting grafted resin material preferably has an acid number greater than about 10, more preferably greater than about 15, more preferably greater than about 16, more preferably greater than about 17, more preferably greater than about 18, more preferably greater than about 19, more preferably greater than about 20, and more preferably greater than about 25.

In one embodiment, the grafted resin material has a resin material:graft monomer molar ratio of from about 50–0.5, more preferably from about 10–2, more preferably from about 5–2, more preferably from about 1.5–0.67, and more preferably about 1. In some embodiments, the weight ratio of graft monomer:resin in a grafted resin product is preferably less than about 1, in other embodiments from about 0.001–1, in other embodiments from about 0.01–1, in other embodiments from about 0.02–1, in other embodiments from about 0.1–1, in other embodiments from about 0.33–1, and in other embodiments from about 0.01–0.3, and in other embodiments from about 0.1–0.2. The grafted resin material preferably contains less than about 10 wt % graft monomer, more preferably less than about 5 wt % graft monomer, more preferably less than about 3 wt % graft monomer and even more preferably from about 2–3 wt % graft monomer.

Resin Blends

Resin blends may also be used. The blends comprising the grafted resin material described herein include both: (i) partially grafted resin material streams wherein only a portion of the resin material in a particular stream is grafted (resulting in a mixture of grafted and un-grafted resin material); and, (ii) blends of partially or fully grafted resin material streams with another tackifying resin. Suitable examples of other tackifying resins include: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, aromatic hydrocarbon resins, at least partially hydrogenated aromatic hydrocarbon resins, polyterpene resins, terpene-phenol resins, rosin acids, resins grafted with graft monomers, and mixtures of any two or more thereof. Suitable resins also include other resins having polar functionality whether produced by processes described herein or other suitable processes.

For example, one embodiment is a composition comprising from about 0.1–99 wt % grafted resin material and from about 1–99.9 wt % other resin, based on the total weight of the composition. Other embodiments comprise from about 0.1–50 wt % grafted resin material, from about 0.1–30 wt % grafted resin material, from about 0.1–20 wt % grafted resin material, from about 1–25 wt % grafted resin material, from, about 1–15 wt % grafted. resin material, from, about 1–10 wt % grafted resin material, from about 5–10 wt % grafted resin material, and from about 10–30 wt % grafted material, based on the total weight of the composition.

In a preferred embodiment, the resin material comprises grafted resin and grafted oligomers in amounts of from about 0.1–50 wt % grafted oligomers, more preferably from about 0.1–30 wt % grafted oligomers, more preferably from about 0.1–20 wt % grafted oligomer, more preferably from about 0.1–10 wt % grafted oligomers, more preferably from about 1–30 wt % grafted oligomers, more preferably from about 1–20 wt % grafted oligomers, and more preferably from about 1–10 wt % grafted oligomers based on the total weight of the resin material. Preferred ranges also include between any upper and lower limit described in this paragraph.

One blend is a composition comprising at least two hydrocarbon resins, wherein at least one of the resins is a grafted resin material grafted with a graft monomer and the other resin is an ungrafted petroleum hydrocarbon resin. "At least two hydrocarbon resins" also includes embodiments of hydrocarbon resins wherein only a portion of the overall resin molecules have been grafted with a graft monomer. While the base resin component may be the same, there are two resins—one grafted and one un-grafted resin within the resin composition. Such an embodiment may include at least two hydrocarbon resins wherein the base resin components are different, e.g. a $C_5/C_9$ resin and a grafted $CPD/C_9$ resin. Other examples include any combination of ungrafted resins and grafted resin materials described herein. For example, suitable petroleum hydrocarbon resins include: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, aromatic hydrocarbon resins, at least partially hydrogenated aromatic hydrocarbon resins, polyterpene resins, rosin esters, and terpene-phenol resins.

Polyolefins

Preferred polyolefins as described herein preferably have an Mw greater than 20,000.

Polyolefins suitable for use in adhesives as described herein include polar polymers. As used herein, polar polymers include homopolymers, copolymers, and terpolymers containing polar groups such as esters, ethers, ketones, amides, imides, alcohols, phenols, halides, acids, anhydrides, sulfides, nitriles, isocyanates, aromatic and heteroaromatic groups. These polar substituents may be found in the polymer backbone, pendant to the polymer backbone or attached to an aromatic group that may be either incorporated in the polymer backbone or pendant to the polymer backbone. Suitable examples include copolymers of a $C_2$ to $C_{20}$ olefin, such as ethylene and/or propylene and/or butene with one or more polar monomers such as vinyl esters or alcohols, acids, anhydrides, acrylic or methacrylic acids or esters. Polar polymers also include any thermoplastic copolymer comprising a functional group capable of interacting with the unsaturated acid or anhydride group present with the resin material. Examples include, but are not limited to, polymers (or copolymers of) such as polyesters, polyamides, polyureas, polycarbonates, polyacrylonitriles, polyacrylates, polymethylacrylates, ethylene vinyl esters, halogenated polymers, polyvinyl chloride, polyethylene terephthalate (PBT), polyacetal, acrylic or methacrylic acids, alkyl acrylates, or methacrylates, ethylene methyl acrylate, ethylene butyl acrylate, and the like. Accordingly, in one embodiment, the grafted resin material may be formulated with a polar polymer, such as EVA. It may optionally comprise other components such as one or more waxes or oils.

Other suitable polyolefins include polyethylene, ethylene copolymerized with one or more $C_3$ to $C_{20}$ linear, branched, or cyclic α-olefins, polypropylene, propylene copolymerized with one or more of ethylene and/or $C_4$ to $C_{20}$ linear, branched, or cyclic α-olefins, polybutylene, polybutylene copolymerized with one or more of $C_5$ to $C_{20}$ linear, branched, or cyclic α-olefins, low density polyethylene (LDPE) (density 0.915 to less than 0.935 g/cm$^3$) linear low density polyethylene (LLPDE), ultra low density polyethylene (density 0.86 to less than 0.90 g/cm$^3$), very low density polyethylene (density 0.90 to less than 0.915 g/cm$^3$), medium density polyethylene (density 0.915 to less than 0.945 g/cm$^3$), and high density polyethylene (HDPE) (density 0.945 to 0.98 g/cm$^3$). Other hydrocarbon polymers (or copolymers of) include: polybutene-1, polyisobutylene, polybutene, polyisoprene, polybutadiene, butyl rubber, amorphous polypropylene, ethylene propylene diene monomer rubber, natural rubber, styrene butadiene rubber, copolymers and halogenated copolymers of isobutylene and para-alkylstyrene, elastomers such as ethylene-propylene rubber (EPR), vulcanized EPR, EPDM, nylons, polycarbonates, PET resins, polymers of aromatic monomers such as polystyrene, copolymers of isobutylene and para-alkyl styrene, high molecular weight HDPE, low molecular weight HDPE, graft copolymers generally, polyacrylonitrile homopolymer or copolymers, thermoplastic polyamides, polyacetal, polyvinylidine fluoride and other fluorinated elastomers, polyethylene glycols, polyisobutylene, or blends thereof Preferred α-olefins include propylene, butene, pentene, hexene, heptene, octene, nonene, dodecene, cyclopentene, 3,5,5-trimethylhexene-1,3-methylpentene-1,4-methyl pentene-1 and terpolymers of the above monomers. In another embodiment, the copolymer comprises a terpolymer of (i) ethylene and/or (ii) a $C_3$ to $C_{20}$ comonomer, and (iii) a diene. Preferred dienes include butadiene, pentadiene, hexadiene, norbornene, ethylidene norbornene, vinyl norbornene, dicyclopentadiene, and substituted versions thereof. The architecture of such polymers may be linear, substantially linear, short-chain branched, long-chain branched, star branched or any other combination thereof. The branches or arms may be the same as the main backbone or different such as branch-block polymers or multi-armed stars.

Suitable polyolefins also include block copolymers of styrene and one or more conjugated dienes such as SI (Styrene-Isoprene), SBS (Styrene-Butadiene-Styrene), SB (Styrene-Butadiene), and SIS (Styrene-Isoprene-Styrene). Styrene block copolymers comprising tetrablock or pentablock copolymers selected from SISI, SISB, SBSB, SBSI, ISISI, ISISB, BSISB, ISBSI, BSBSB, and BSBSI are also suitable. The block copolymers may be completely or partially hydrogenated to give a resulting SEBS (Styrene-Ethylene-Butene-Styrene) polymer. The architecture of the block copolymers includes linear, radial or multi-arm star, or multi-branched and may include various combinations of styrene, isoprene, or butadiene, which may or may not be hydrogenated.

Other suitable polyolefins include grafted polymers or blends of grafted polymers and/or non-grafted polymers. Examples of polymers and of such blends include, but are not limited to, those described in U.S. Pat. No. 5,936,058.

Other suitable polyolefins include elastomers, in particular, to form adhesive sealants. Preferred elastomers include natural rubber, polyisoprene, polybutadiene, copolymers of butadiene with styrene, copolymers of butadiene with acrylonitrile, butyl rubber, polychloroprene, ethylene/propylene rubber and elastomeric copolymers of ethylene, propylene and a non-conjugated diene, styrenic block copolymers such as block copolymers of styrene and or a-methyl styrene with an alkadiene (such as isoprene or butadiene) in linear, radial, and/or tapered form.

In one embodiment, the polyolefin may be a polymer produced using a metallocene catalyst system. Typically, the metallocene homopolymers or copolymers are produced using mono- or bis-cyclopentadienyl transition metal catalysts in combination with an activator of alumoxane and/or a non-coordinating anion in solution, slurry, high-pressure or gas phase. The catalyst system may be supported or unsupported and the cyclopentadienyl rings may be substituted or unsubstituted. Titanium, zirconium and hafnium are preferred transition metals. Several products produced with such catalyst/activator combinations are commercially available from ExxonMobil Chemical Company in Baytown, Tex. under the tradenames EXCEED™ and EXACT™ or from Dow Chemical Company under the tradenames ENGAGE™ and AFFINITY™. Suitable polyolefins also include plastomers.

The metallocene produced copolymers described above preferably have a polydispersity less than 4 and a composition distribution breadth index (CDBI) of 50% or more, preferably above 60%, even more preferably above 70%. In one embodiment, the CDBI is above 80%, even more preferably above 90%, even more preferably above 95%. In one embodiment, the polyethylene copolymer has a CDBI of from 60–85%, even more preferably from 65–85%.

Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight (Mw) below 15000 are ignored when determining CDBI.

The adhesive may also comprise additives well known in the art such as processing oils, performance oils, anti-block, anti-static, antioxidants, cross-linking agents, silica, carbon black, talc, pigments, fillers, processing aids, UV stabilizers, neutralizers, lubricants, anti-slip agents, slip agents, surfactants, and/or nucleating agents. Examples of common additives include: antioxidants such as Irganox™ 1010, silicon dioxide, titanium dioxide, polydimethylsiloxane, talc, dyes, wax, calcium stearate, carbon black and glass beads. In HMA applications, suitable synthetic waxes include paraffin and microcrystalline waxes having melting points within a range from about 55° C. to about 130° C. and low molecular weight polyethylene and Fischer-Tropsch waxes. The wax content is preferably from about 1 to about 35 wt.% of the total blend composition. In PSA applications, suitable oils include FLEXON™ 876 or PRIMOL™ 352 available from ExxonMobil Chemical Company at concentrations less than 50%.

The adhesives may be formulated into pressure sensitive adhesives that may be applied to any conventional backing layer such as paper, foil, polymeric film, release liners, woven or non-woven backing material to make for example, packaging tapes, masking tapes and labels.

One embodiment of a hot melt pressure sensitive comprises 100 parts by weight of a polyolefin, preferably a styrene block copolymer, 50–150 phr (parts per 100 parts by weight polyolefin) of a resin as described herein, 0–50 phr of an extender oil, more preferably 10–50 phr, more preferably 15–50 phr, more preferably 20–50 phr, more preferably 25–50 phr, more preferably 30–50 phr, more preferably 35–50 phr, more preferably 40–50 phr, more preferably 45–50 phr, and 0–5 phr antioxidant.

Optional components in hot melt adhesives are plasticizers or other additives such as oils, tackifiers, surfactants, fillers, color masterbatches, and the like. Preferred plasticizers include mineral oils, polybutenes, phthalates, and the like. Particularly preferred plasticizers include phthalates such as diisodecyl phthalate (DIOP), diisononylphthalate (DINP), and dioctylphthalates (DOP). Particularly preferred oils include aliphatic naphthenic oils.

Another optional component of a hot melt adhesive is a low molecular weight product such as wax, oil, or low Mn polymer (low meaning below Mn of 5000, preferably below 4000, more preferably below 3000, even more preferably below 2500). Preferred oils include aliphatic naphthenic oils, white oils, or the like. Preferred low Mn polymers include polymers of lower α-olefins such as propylene, butene, pentene, and hexene. A particularly preferred polymer includes polybutene having a Mn of less than 1000. An example of such a polymer is available under the trade name PARAPOL™ 950 from ExxonMobil Chemical Company. PARAPOL™ 950 is a liquid polybutene polymer having a Mn of 950 and a kinematic viscosity of 220 cSt at 100 ° C., as measured by ASTM D 445. Suitable embodiments of HMAs generally comprise 20–70 wt % resin material or blends as described herein, 30–80 wt % polyolefin, and 0–35 wt % wax.

HMA embodiments can be used for disposable diaper and napkin chassis construction, elastic attachment in disposable goods, converting, packaging, labeling, bookbinding, woodworking, and other assembly applications. Particular examples include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkins adhesive strip, industrial filtration bonding, industrial filter material lamination, filter mask lamination, surgical gown lamination, surgical drape lamination, and perishable products packaging. Suitable embodiments of woodworking applications comprise 30–50 wt % polyolefins, preferably an EVA, 15–35 wt % resins as described herein, and 20–50 wt % fillers, such as calcium carbonate, barium sulfate, silica or titanium dioxide. Suitable embodiments of bookbinding applications include 35–45 wt % polyolefin, preferably an EVA, 35–45 wt % resin as described herein, and 10–25 wt % wax.

The adhesives and adhesives chosen by the methods described herein are especially useful in articles having an adhesive bond, in particular, in articles having at least one bonded surface that may be classified as a difficult substrate. Such substrates generally have low energy (non-polar and/or smooth) surfaces. Examples include, but are not limited to, fluorinated surfaces, such as fluorinated paper, polyolefinic surfaces, e.g., polyethylene, polypropylene, acrylic-coated papers, polymers, and films, and PET. Typical articles that may include such substrates are packaging films, cartons, boxes and cases, cereal boxes, and packaging innerliners, e.g., pet food bag innerliners.

EXAMPLES

Properties and Test Methods

In the following examples, Hot Melt Adhesives (HMAs) were prepared as follows. The components of the HMA formulation were introduced in a Z-blade mixer previously heated to 180° C. under nitrogen blanketing. Any waxes or other components were introduced after 10 minutes, and the mixing was continued for another 60 min. The mixer was stopped, the nitrogen blanket was removed, and the blend was poured into a tray made from standard release paper. The blend was further cooled under nitrogen blanket and covered with release paper.

HMA formulations were made with the components and their parts by weight listed in the relevant tables below. Tackifier 1 was a thermally-polymerized hydrogenated aromatic-containing DCPD resin grafted with 2.5 wt % maleic anhydride (Saponification No. 25 gm KOH/g resin, Softening Point 94° C.). Tackifier 2 was Sylvalite™ RE 100 tall oil rosin ester available from Arizona Chemical Company (softening point 96° C., Mn 950, Mw 1110, Saponification No. 26). Tackifier 3 was a thermally-polymerized hydrogenated aromatic-containing DCPD resin (available as Escorez™ 5600 from ExxonMobil Chemical Company having a softening point of 103° C., Mn 270, and Tg 55° C.). The EVA was Escorene UL 40028 ethylene vinyl acetate copolymer having a MI of 400 g/10 min, a density of 0.947 g/cm$^3$ and a vinyl acetate content of 28 % available from ExxonMobil Chemical Company. The other components were:

| Component | Description | Source |
|---|---|---|
| Irganox™ 1010 | Phenolic antioxidant | Ciba-Geigy |
| Np Wax | PARAFFIN WAX 68° C. Normal paraffin (Np) wax (Melting point 68° C.) | TotalElfAtoFina |
| FT Wax | PARAFLINT H1, Fischer Tropsch polyethylene wax | Schumman-Sasol |

The samples were prepared for the AFM analysis as follows. A series of cardboard substrates were cut into 2.5 cm×7.5 cm strips and weighed. The HMA formulations were made as previously described and heated to 170° C. in glass tubes placed in a heated aluminum block. When the HMA was molten, a warm glass eyedropper was used to apply a drop of adhesive of approximately 3 mm diameter (approximately 0.1 to 0.15 g) to the cardboard. A strip of polyethylene-co-tetrafluoroethylene (500 µm thick), obtained from the DuPont Company under the trade name of Tefzel 500CLZ, was immediately applied to the cardboard having the adhesive thereon. A weight of 378 g was placed on top of the assembly for approximately 30 seconds. The weight was made of stainless steel and its bottom dimensions were 5.5 cm×8.5 cm so that it covered the assembled structure completely. The assembled structure was then weighed to determine the amount of adhesive between the substrates. The specimens were then left for at least 24 hours before further manipulation/evaluation.

The Tefzel film was gently peeled off the surface, and a section of the adhesive with a smooth surface was selected for examination.

Atomic Force Microscopy (AFM) also known as Scanning Force Microscopy (SFM) was used for surface analysis with high spatial resolution. A resolution of about 10 nm was used. AFM is used to investigate polymer surfaces where an intermittent contact mode is used because of the soft polymer surface. The method uses high mechanical frequencies (>100 kHz) to "tap" the polymer surface (tapping mode). AFM has been used to successfully image the surfaces of PSAs (Döring, A., Stahr, J., Zollner, S., 23rd Ann tech Seminar Proc, Pressure Sensitive Tapes for the New Milleneum, New Orleans, La., May 3–5, 2000). The AFM may be and was operated in "pulsed force" mode (PFM) in which the probe tip contacts the polymer surface for a very short time (100 µs), and its downward and upward motions are detected and analyzed to give values for both stiffness and pull-force of the surface. (Döring, A., PhD Thesis, University of Ulm, 2001, Döring, A., Hild, S., Schroth, K., Paper 33 at the Rubber Division meeting of the ACS, Savannah, Ga., Apr. 29–May 1, 2002). (To achieve results for a pressure sensitive adhesive (not evaluated in these examples), the adhered structure having the adhesive to be evaluated should be immersed in liquid nitrogen for 5 minutes before removal of the Tefzel film.)

For the examples described herein, a cryo-faced surface was prepared by cooling down the sample to −150° C. and cutting a flat surface parallel to the adhesive surface that had been in contact with the Tefzel film by cutting off about a 1 µm layer of adhesive. The surface layer was cut using a diamond knife (Reichert-Jung™ cryo-microtome) and removed.

The remaining cryo-faced surface was mapped/investigated using a PARK M5 AFM equipped with a WiTec™ PFM attachment. Pull-off force and stiffness images were recorded for a 3×3 µm area using a point probe from Nanosensor™ (Force Modulation Reflect Coated, force constant of 1.2–5.5 N/m), a frequency of 280–304 Hz, an amplitude of 13–14% and a set point of 1 nN. The PFM generated a set 3×3 µm image file which was subject to further processing.

As shown in the Figures, the images show light and dark domains (in varying gray scale 256 levels), corresponding to domains of high and low pull-off force (adhesion) or high and low stiffness. To quantify the area of the domains, the following image analysis procedure was used, using functions that are commonly available in the AFM control software and standard image processing software, such as Adobe Photoshop™ version 6, with Image Processing Tool Kit version 5.2 available from Reindeer Games, Inc.

1. A PFM image (3×3 microns) generated during the PFM analysis was flattened to remove artifacts such as intensity shifts between adjacent scan lines.

FIGS. 1–6 are the result of step 1.

2. A 1-pixel Median Filter was applied to the PFM image to suppress instrument noise from the PFM analysis.
3. The image contrast was normalized using an Auto-Contrast function.
4. The domains with low image intensity (low stiffness domains or low pull off force domains) were selected by setting a binary threshold at 20% of the full intensity scale (grayscale level 51 gray and below for an image with 256 levels of gray). The size of the low intensity domains was determined, using the IP_Features function of the Image Processing Tool Kit, which also produces a list of the low-intensity domain area measurements.

Figure 13:
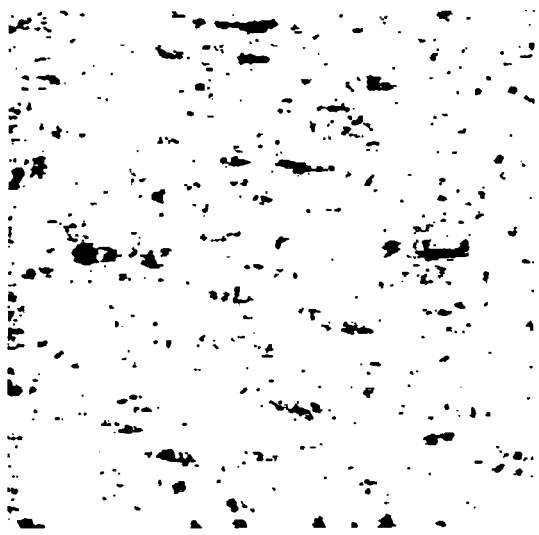
FIGS. 13–16 are images derived during image processing and illustrate the low intensity domains and the high intensity domains found in each of FIGS. 3 and 4 at the image processing steps indicated below.
Figure 15:
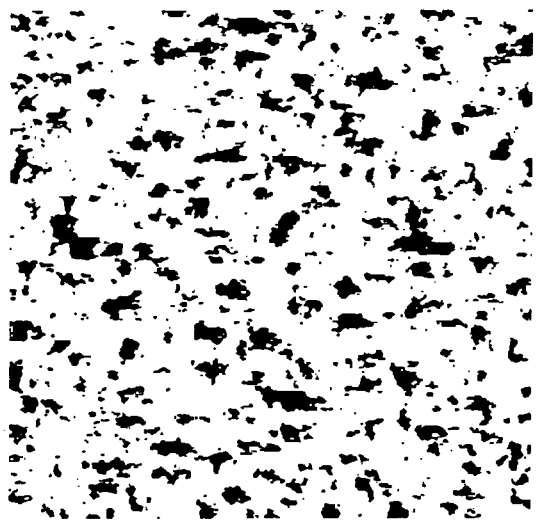

FIGS. 13 and 15 illustrate typical results one might obtain from step 4 (based on Comparative Example 2).

5. The domains with high image intensity (high stiffness or high pull-off force) are selected by setting a binary threshold at 80% of the full intensity scale (grayscale level 205 and above for an image with 256 levels of gray). The size of the high intensity domains was determined, using the IP_Features function of the Image Processing Tool Kit, which also produces a list of the high intensity domain area measurements.

Figure 14:
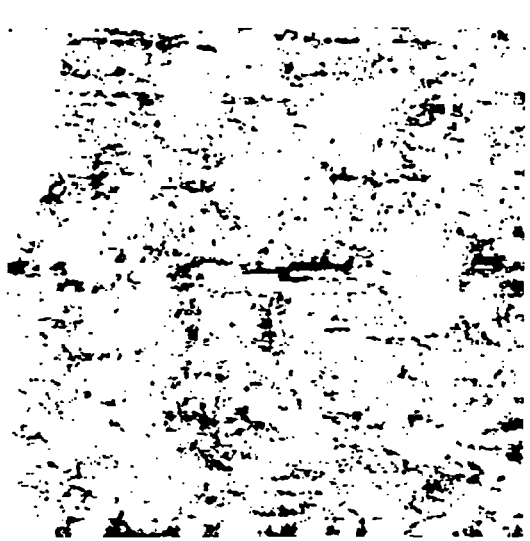
Figure 16:
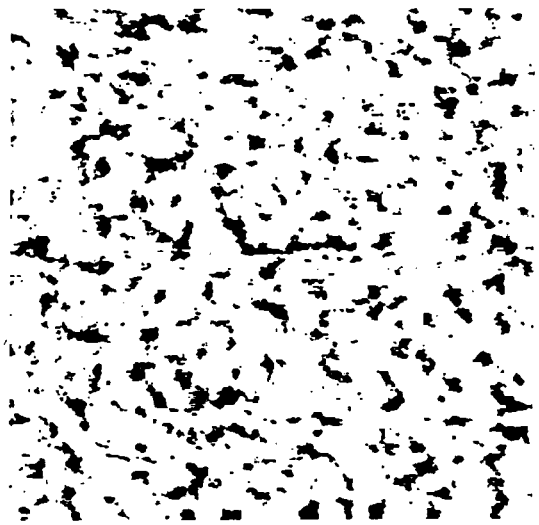

FIGS. 14 and 16 illustrate typical results one might obtain from step 5 (based on Comparative Example 2).

6. The data sets/lists of high and low intensity domain areas from steps 4 and 5 were combined, and domains smaller than 100 nm² were removed because they are of the same order of magnitude as the AFM probe tip.

7. The overall average domain area for a given domain (3×3 µm) is then calculated by averaging the values generated in the combined data sets from step 6.

8. Average domain areas could also be calculated for: the low intensity domains by averaging the values generated in step 4; and/or the high intensity domains by averaging the values generated in step 5.

Domain Distribution

The homogeneity or domain distribution of a particular sample is calculated as follows. First, a 3×3 µm image was generated upon completion of step 4 to evaluate the low intensity domains. Another 3×3 µm image was generated upon completion of step 5 to evaluate the high intensity domains. Each image was then divided into quadrants (1.5× 1.5 µm) as follows (not to scale):

| 1 | 2 |
|---|---|
| 3 | 4 |

Steps 6 and 7 were then conducted on each quadrant, including combining the data sets to generate the average values of the domain areas. The resulting average domain area for each quadrant was then compared to the overall average domain area for the overall 3×3 µm image as generated by step 7 above. The quadrant domain area difference is calculated as follows (expressed as a percentage):

$$\frac{A_Q - A_S}{A_S} \times 100$$

where $A_Q$ is the average domain area for the quadrant, and $A_S$ is the average domain area for the overall 3×3 µm sample area.

The overall average domain distribution is the average of each domain area difference and is expressed as a percentage. It may be calculated for both pull-off force domains and stiffness domains.

TABLE 1

Formulations of Adhesives without Wax

| | | Example | |
|---|---|---|---|
| | 1 | 2 (Comparative) | 3 (Comparative) |
| Formulations (parts by weight) | | | |
| Tackifier 1 | 45 | 0 | 0 |
| Tackifier 2 | 0 | 45 | 0 |
| Tackifier 3 | 0 | 0 | 45 |
| EVA | 35 | 35 | 35 |
| Irganox™ 1010 | 0.5 | 0.5 | 0.5 |
| Stiffness | | | |
| Overall Average Domain Area (nm²) | 1364 | 2961 | 4692 |
| Average High Intensity Domain Area (nm²) | 1402 | 2765 | 6056 |
| Average Low Intensity Domain Area (nm²) | 1303 | 3140 | 3365 |
| Average Domain Area for Quadrant 1 (nm²) | 1301 | 3046 | 2028 |
| Quadrant domain average area difference (%) | 5 | −3 | 57 |
| Average Domain Area for Quadrant 2 (nm²) | 1398 | 2593 | 6335 |
| Quadrant domain average area difference (%) | −3 | 12 | −35 |
| Average Domain Area for Quadrant 4 (nm²) | 1188 | 2740 | 3819 |
| Quadrant domain average area difference (%) | 13 | 7 | 19 |
| Pull-Off Force | | | |
| Overall Average Domain Area (nm²) | 597 | 983 | 6275 |
| Average High Intensity Domain Area (nm²) | 539 | 937 | 5098 |
| Average Low Intensity Domain Area (nm²) | 713 | 1163 | 2499 |
| Average Domain Area for Quadrant 1 (nm²) | 625 | 1117 | 5491 |
| Quadrant domain average area difference (%) | −5 | −14 | 12 |
| Average Domain Area for Quadrant 2 (nm²) | 563 | 828 | 5876 |
| Quadrant domain average area difference (%) | 6 | 16 | 6 |
| Average Domain Area for Quadrant 4 (nm²) | 579 | 817 | 5099 |
| Quadrant domain average area difference (%) | 3 | 17 | 19 |

FIGS. 1 to 6 show the adhesive phase structures without the wax where the polymer/tackifier phase structures can be analysed without the interference of the wax crystals. The images show the cryo-microtomed surfaces as described herein. The formulation containing Tackifier 1 (FIGS. 1 and 2) has the smallest domains, the least variation in the sizes of the domains and the most even distribution of the domains, which is indicative of the best adhesive performance. The formulation containing Tackifier 2 (FIGS. 3 and 4) has bigger domains less evenly distributed throughout the matrix, which is indicative of inferior performance. The formulation containing Tackifier 3 (FIGS. 5 and 6) has large stiffness/adhesion domains which are irregularly distributed throughout the image.

In Examples 4–6, AFM images in "tapping mode" were generated as shown in FIGS. 7–12, based on the formulations shown in Table 2. The images were flattened and subjected to noise reduction using a 2-pixel Median Filter.

TABLE 2

Adhesives with Wax

| Formulation (parts by weight) | 4 | 5 (Comparative) | 6 (Comparative) |
|---|---|---|---|
| Tackifier 1 | 45 | 0 | 0 |
| Tackifier 2 | 0 | 45 | 0 |
| Tackifier 3 | 0 | 0 | 45 |
| EVA | 35 | 35 | 35 |
| Np Wax | 10 | 10 | 10 |
| FT Wax | 10 | 10 | 10 |
| Irganox ™ 1010 | 0.5 | 0.5 | 0.5 |

FIGS. 7 to 12 show a fully formulated HMA containing an EVA copolymer, tackifier, waxes and antioxidant as described in Table 2. The AFM images show the surface of the adhesive that was in contact with the Tefzel film. The topography images (FIGS. 7, 9 and 11) and phase shift images (FIGS. 8, 10 and 12) clearly show the surfaces of the formulations. The images (FIGS. 11/12) illustrating the formulation with Tackifier 3 in Example 6 are dominated by large wax crystal structures which adversely affect the surface adhesion. The images showing the formulation containing Tackifier 2 in Example 5 (FIGS. 9/10) illustrate an improvement over the formulation containing Tackifier 3 because the wax crystals are less prominent, but they still appear to adversely affect the surface adhesion. In the formulation containing Tackifier 1 in Example 4, the images (FIGS. 7/8) illustrate that the wax crystals are less prominent, and therefore, do not affect the surface adhesion adversely as indicated in Examples 5 and 6.

Various tradenames used herein are indicated by a ™ symbol, indicating that the names may be protected by certain trademark rights. Some such names may also be registered trademarks in various jurisdictions.

All, patents, test procedures, and other documents cited herein, including priority documents, are fully incorporated herein by reference to the extent such disclosure is not inconsistent with this invention and for all jurisdictions in which such incorporation is permitted.

The invention claimed is:

1. A method for selecting an adhesive composition having improved performance, the method comprising observing a surface with an atomic force microscope, characterized in that the surface is a non-destructively de-bonded surface of the adhesive composition, and that the method further comprises
    (a) subdividing the de-bonded surface into domains of pull-off force or stiffness; and
    (b) selecting an adhesive composition having
        (i) an average stiffness domain area less than about 2500 $nm^2$; or
        (ii) an average pull-off force domain area less than about 2500 $nm^2$; or
        (iii) a pull-off force overall average domain distribution less than about 25%; or
        (iv) a stiffness overall average domain distribution less than about 25%; or
        (v) combinations of any two or more thereof.

2. The method of claim 1 comprising selecting an adhesive composition having at least two of parameters (i)–(iv).

3. The method of claim 2 comprising selecting an adhesive composition having at least three of parameters (i)–(iv).

4. The method of claim 3 comprising selecting an adhesive composition having all of parameters (i)–(iv).

5. A method for selecting an adhesive composition, the method comprising:
    (a) observing a non-destructively de-bonded surface of the adhesive composition;
    (b) subdividing the de-bonded surface into domains of at least one of pull-off force or stiffness; and
    (c) selecting an adhesive composition having at least one of the following parameters:
        (i) an average stiffness domain area less than about 2500 $nm^2$;
        (ii) an average pull-off force domain area less than about 2500 $nm^2$;
        (iii) a pull-off force overall average domain distribution less than about 25%; or
        (iv) a stiffness overall average domain distribution less than about 25%.

6. The method of claim 5 comprising selecting an adhesive composition having at least two of parameters (i)–(iv).

7. The method of claim 6 comprising selecting an adhesive composition having at least three of parameters (i)–(iv).

8. The method of claim 7 comprising selecting an adhesive composition having all of parameters (i)–(iv).

* * * * *